US011043683B2

(12) United States Patent
Lee et al.

(10) Patent No.: US 11,043,683 B2
(45) Date of Patent: Jun. 22, 2021

(54) FUEL CELL SYSTEM AND METHOD FOR CONTROLLING THE SAME

(71) Applicants: HYUNDAI MOTOR COMPANY, Seoul (KR); KIA MOTORS CORPORATION, Seoul (KR)

(72) Inventors: Sung Ho Lee, Seongnam-si (KR); Jong Jin Yoon, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 274 days.

(21) Appl. No.: 16/050,116

(22) Filed: Jul. 31, 2018

(65) Prior Publication Data
US 2019/0356005 A1 Nov. 21, 2019

(30) Foreign Application Priority Data
May 17, 2018 (KR) .................. 10-2018-0056472

(51) Int. Cl.
*H01M 8/04992* (2016.01)
*H01M 8/04119* (2016.01)
*H01M 8/0432* (2016.01)
*H01M 8/0438* (2016.01)
*H01M 8/04492* (2016.01)
*H01M 8/04537* (2016.01)
*H01M 8/2457* (2016.01)
*H01M 8/1018* (2016.01)

(52) U.S. Cl.
CPC ..... *H01M 8/04992* (2013.01); *H01M 8/0432* (2013.01); *H01M 8/04179* (2013.01); *H01M 8/04388* (2013.01); *H01M 8/04492* (2013.01); *H01M 8/04619* (2013.01); *H01M 8/2457* (2016.02); *H01M 2008/1095* (2013.01)

(58) Field of Classification Search
CPC .......... H01M 8/04992; H01M 8/2457; H01M 8/04492; H01M 8/04179; H01M 8/04619; H01M 8/0438; H01M 8/0432; H01M 8/04291; H01M 2008/1095
See application file for complete search history.

(56) References Cited

U.S. PATENT DOCUMENTS

| 9,660,280 | B2 | 5/2017 | Lee et al. | |
|---|---|---|---|---|
| 2012/0288782 | A1* | 11/2012 | Blunk | H01M 8/0221 429/465 |
| 2014/0335430 | A1* | 11/2014 | Kaito | H01M 8/04225 429/428 |
| 2015/0280260 | A1* | 10/2015 | Lee | H01M 8/04164 429/414 |

FOREIGN PATENT DOCUMENTS

| JP | 2006-294458 A | 10/2006 |
|---|---|---|
| JP | 4623274 B2 | 2/2011 |
| KR | 10-1575330 b1 | 12/2015 |

* cited by examiner

*Primary Examiner* — Ula C Ruddock
*Assistant Examiner* — Matthew W Van Oudenaren
(74) *Attorney, Agent, or Firm* — Brinks Gilson & Lione

(57) ABSTRACT

A fuel cell system includes a fuel cell stack that produces electric power and water through an electro-chemical reaction of hydrogen and air. A controller of the fuel cell system calculates an amount of water in the fuel cell stack based on output power of the fuel cell stack and a maximum amount of residual water to which the amount of water in the fuel cell stack converges over time. The fuel cell system may detect the amount of water in the fuel cell stack in real time.

15 Claims, 9 Drawing Sheets

FUEL CELL SYSTEM AND METHOD FOR CONTROLLING THE SAME

CROSS-REFERENCE TO RELATED APPLICATION

This application claims priority to and the benefit of Korean Patent Application No. 10-2018-0056472, filed on May 17, 2018, the entire contents of which are incorporated herein by reference.

FIELD

The present disclosure relates to a fuel cell system and a method for controlling the same.

BACKGROUND

The statements in this section merely provide background information related to the present disclosure and may not constitute prior art.

A fuel cell system that continually produces electrical energy through an electro-chemical reaction of fuel continuously supplied thereto has been studied and developed as an alternative for solving global environmental problems.

The fuel cell system includes a stack having tens to hundreds of cells stacked in series. The stack has a structure in which the cells are stacked between end plates, and each cell includes an electrolyte membrane that divides the interior in half, an anode on one side of the electrolyte membrane, and a cathode on an opposite side thereof.

When hydrogen is supplied to the anode, the hydrogen is divided into hydrogen ion and electron by a catalyst. The electron moves outside the stack through a separator to produce electricity. The hydrogen ion passes through the electrolyte membrane and moves to the cathode, after which the hydrogen ion is combined with oxygen and electron supplied from the outside to produce water and then discharged to the outside.

Meanwhile, water produced and remaining in the fuel cell stack without being discharged needs to be removed since the remaining water hinders a flow of oxygen and hydrogen. However, a portion of the produced water may be discharged by a flow of hydrogen or air, whereas the rest may remain in the fuel cell stack without being discharged. Especially, in the case where a large amount of water exists on the anodes of the fuel cell stack, the water may hinder supply of hydrogen fuel to degrade power generation performance of the fuel cell stack and may cause damage to components of the fuel cell stack.

To solve these problems, exhaust lines are connected to the anodes in the stack to discharge gas in the anodes to the outside every predetermined period by opening/closing a purge valve. However, we have discovered that the purge gas discharged from the anodes contains hydrogen having a considerable concentration (generally, a level of 60% to 70%), and the discharge of hydrogen may cause deterioration in efficiency of the fuel cell system due to a reduction in hydrogen utilization rate.

SUMMARY

The present disclosure has been made to solve the above-mentioned problems occurring in the related art while advantages achieved by the related art are maintained intact.

An aspect of the present disclosure provides a fuel cell system capable of efficiently operating by accurately predicting an amount of water in a fuel cell stack and discharging the water from the fuel cell stack at the right time.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a fuel cell system includes a fuel cell stack that produces electric power and water through an electro-chemical reaction of hydrogen and air and a controller that calculates an amount of water in the fuel cell stack, based on an output power of the fuel cell stack and a maximum amount of residual water to which the amount of water in the fuel cell stack converges over time.

According to another aspect of the present disclosure, a method for controlling a fuel cell system includes the steps of: calculating, by a controller, a maximum amount of residual water to which an amount of water in a fuel cell stack converges over time based on an output power of the fuel cell stack and calculating, by the controller, the amount of water in the fuel cell stack based on the maximum amount of residual water and the output power of the fuel cell stack.

The fuel cell system of the present disclosure, which has the above-described configuration, may accurately calculate the amount of water in the fuel cell stack in real time and may discharge water by purging hydrogen as needed, thereby reducing an amount of hydrogen discharged to the outside and enabling an efficient operation.

That is, the fuel cell system of the present disclosure may accurately calculate the amount of water actually remaining in the fuel cell stack in real time, based on an amount of water discharged by a gas flow in the fuel cell stack, as well as an amount of water produced in the fuel cell stack.

In addition, the fuel cell system of the present disclosure may prevent power generation performance of the fuel cell stack from being degraded caused by insufficient supply of fuel due to water in the fuel cell stack.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
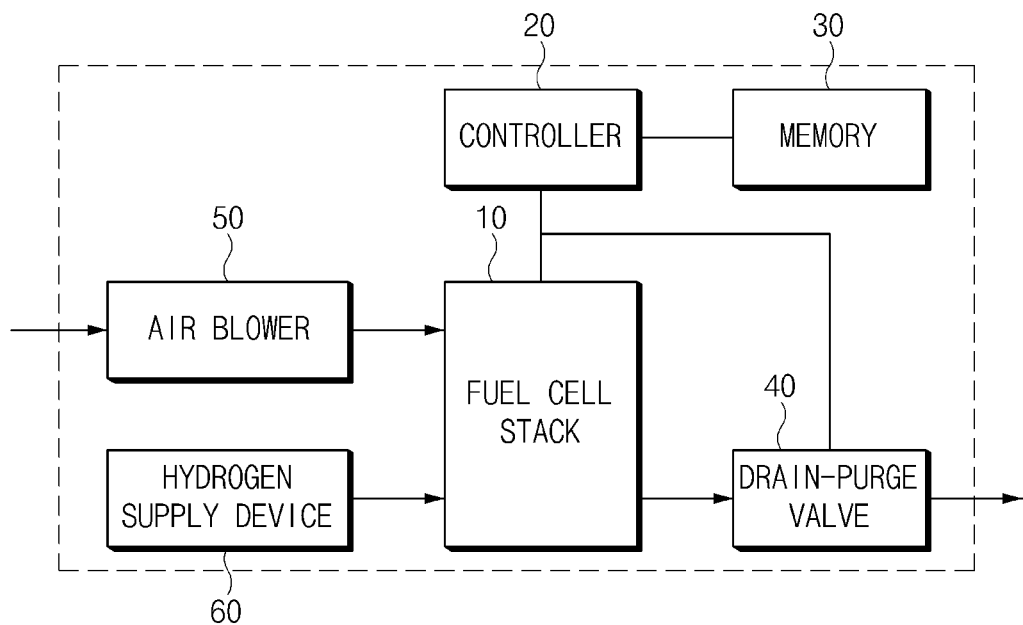
FIG. 1 is a block diagram of a fuel cell system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, a detailed description of well-known features or functions will be ruled out so as not to unnecessarily obscure the gist of the present disclosure.

FIG. 1 is a block diagram of a fuel cell system in one form of the present disclosure.

The fuel cell system in one form of the present disclosure may include a fuel cell stack 10 that produces electric power and water through an electro-chemical reaction of hydrogen and air, a controller 20, a memory 30, a drain-purge valve 40 that regulates water, hydrogen, or the like discharged from the fuel cell stack 10, an air blower 50 that supplies air including oxygen to the fuel cell stack 10, and a hydrogen supply device 60 that supplies hydrogen to the fuel cell stack 10.

According to one form, the fuel cell system may not include some of the components or may further include additional components. However, the fuel cell system includes the fuel cell stack 10 and the controller 20 in either case.

The fuel cell stack 10 may have a plurality of fuel cells stacked one above another, each of which includes an electrolyte membrane and a pair of electrodes (a cathode and an anode) disposed on opposite sides of the electrolyte membrane. The fuel cell stack 10 may produce electric power through an electro-chemical reaction of hydrogen and oxygen.

While the fuel cell system is operating, air including oxygen may be supplied to the cathodes of the fuel cell stack 10, and hydrogen may be supplied to the anodes of the fuel cell stack 10. At this time, air and hydrogen may be heated to a high temperature suitable for reaction and then supplied to the fuel cell stack 10. In addition, air may be humidified and then supplied to the fuel cell stack 10 to maintain the fuel cell stack 10 at a predetermined humidity or higher for electro-chemical reaction.

Humidified air may move along a flow passage in the fuel cell stack 10 and may react with hydrogen to produce water. Hydrogen supplied to the fuel cell stack 10 may react with oxygen, and residual hydrogen that does not undergo the reaction may be discharged toward outlet ends of the anodes, in which case the residual hydrogen may be discharged with moisture.

Meanwhile, water produced and remaining in the fuel cell stack 10 without being discharged needs to be removed since the remaining water hinders a flow of oxygen and hydrogen. However, a portion of the produced water may be discharged by a flow of hydrogen or air, whereas the rest may remain in the fuel cell stack 10 without being discharged. Especially, in the case where a large amount of water exists on the anodes of the fuel cell stack 10, the water may hinder supply of hydrogen fuel to degrade power generation performance of the fuel cell stack 10 and may cause damage to components of the fuel cell stack 10.

A method of increasing the flow rate of fluid (gas mixture containing moisture) in the fuel cell stack 10 by raising the quantity of flow in the fuel cell stack 10 may be used to discharge water in the fuel cell stack 10. The most frequently used method is to periodically purge hydrogen. To remove moisture in the fuel cell stack 10, the flow rate of hydrogen in the fuel cell stack 10 may be increased by purging hydrogen through the drain-purge valve 40. The purging of hydrogen may remove moisture in the fuel cell stack 10, but the discharge of hydrogen to the outside may reduce fuel efficiency and may increase the risk of explosion.

The fuel cell system in one form of the present disclosure relates to a technology for accurately determining time to discharge water in the fuel cell stack 10 to avoid or prevent degradation in power generation performance of the fuel cell stack 10 and minimize disadvantages in discharging water by purging hydrogen. More specifically, the fuel cell system in exemplary forms of the present disclosure is basically characterized by calculating an amount of water in the fuel cell stack 10 in real time, based on a maximum amount of residual water remaining in the fuel cell stack 10 and output power of the fuel cell stack 10.

In addition, the fuel cell system in one form of the present disclosure is characterized by calculating an amount of water remaining in the fuel cell stack 10, based on an amount of water produced in the fuel cell stack 10 and an amount of water discharged from the fuel cell stack 10 by a gas flow (e.g., hydrogen) in the fuel cell stack 10.

The fuel cell system in one form of the present disclosure will be described below in more detail.

Some of the components in the fuel cell system are generally known in the art to which the present disclosure pertains, and therefore descriptions thereof will be omitted.

The controller 20 may control the components of the fuel cell system. The controller 20 may obtain information about the fuel cell system or a signal from the components of the fuel cell system.

The controller 20 may be implemented with at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

A control method of the controller 20 will be described below in more detail with reference to FIG. 2 and the following drawings.

The drain-purge valve 40 may be a valve for discharging water or a gas mixture in the fuel cell stack 10. A flooding state in which water is not well discharged from the fuel cell stack 10 may hinder supply of hydrogen fuel to degrade power generation performance of the fuel cell stack 10 and in a serious case, may cause damage to components of the fuel cell stack 10.

The drain-purge valve 40 may be partly opened such that a portion of water in the fuel cell stack 10 is discharged by pressure of air or hydrogen introduced into the fuel cell system in operation. The drain-purge valve 40 may be completely opened to reduce flow resistance to discharge water in the fuel cell stack 10 to the outside when hydrogen is purged.

The hydrogen supply device 60 may be a common hydrogen tank and may store and supply high-pressure hydrogen to the fuel cell stack 10. The high-pressure hydrogen from the hydrogen supply device 60 may be decompressed by a pressure regulator, a pressure control valve, an injector, and a pressure control actuator (not illustrated) and then supplied to the fuel cell stack 10.

Figure 2:
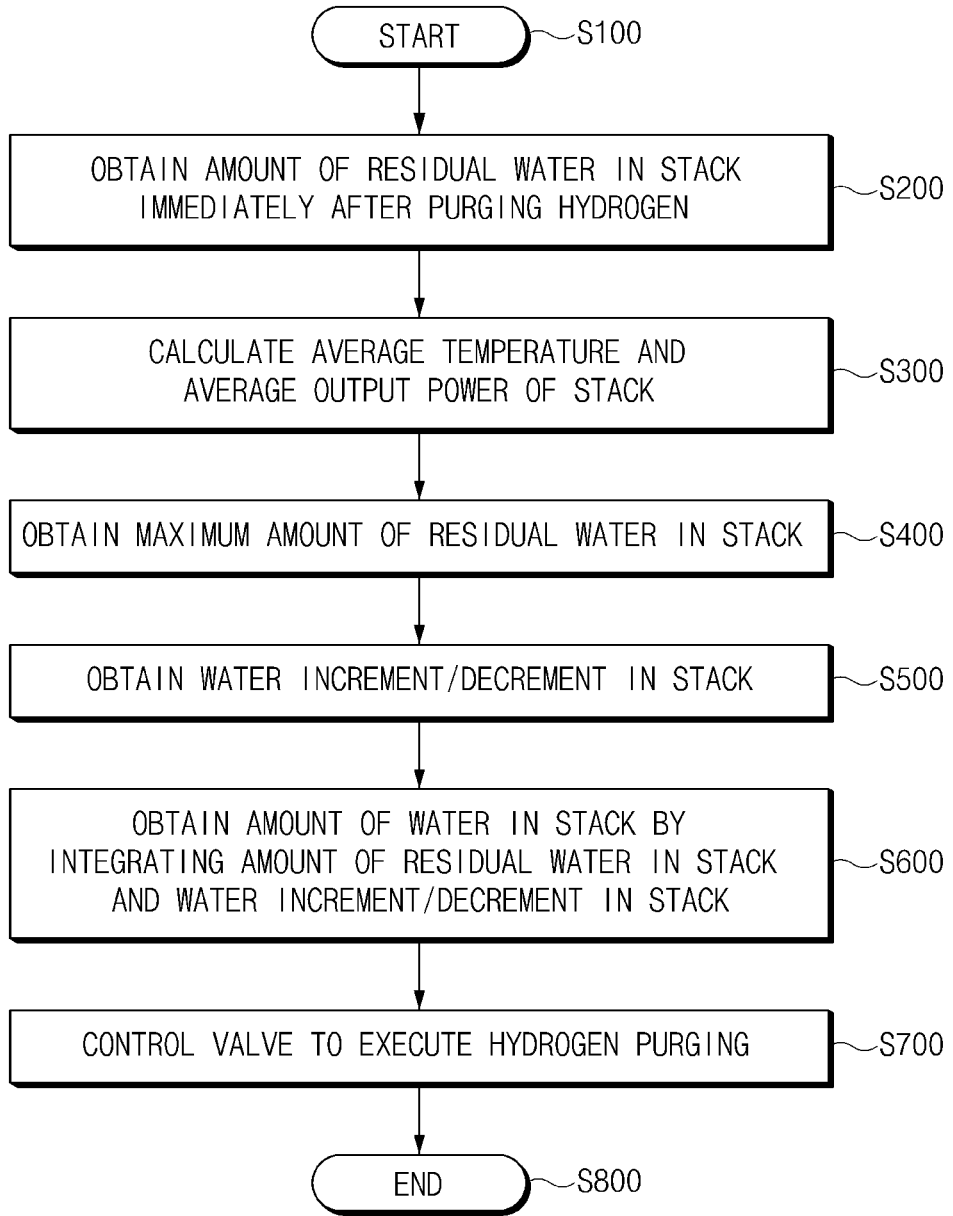
FIG. 2 is a control flowchart illustrating a method for controlling the fuel cell system.
Figure 3:
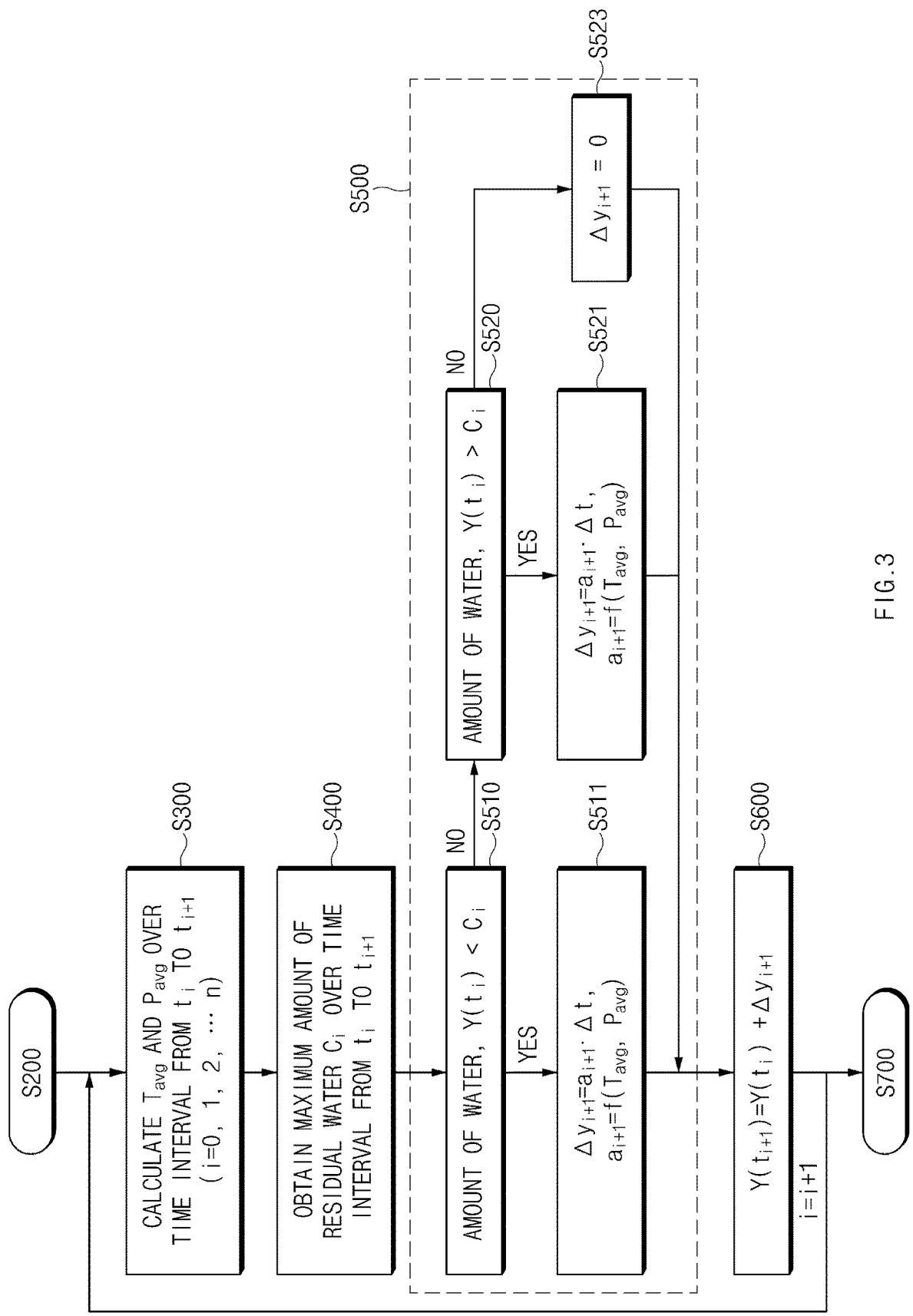
FIG. 3 is a control flowchart for explaining the control method of FIG. 2 in more detail.

FIG. 2 is a control flowchart illustrating a method for controlling the fuel cell system in one form of the present disclosure, and FIG. 3 is a control flowchart for explaining the control method of FIG. 2 in more detail.

Referring to FIG. 2, the controller 20 may start control logic to calculate an amount of water in the fuel cell stack 10 when starting up the fuel cell system or after discharging water in the fuel cell stack 10 by purging hydrogen (Step S100).

The controller 20 may calculate an amount of residual water remaining in the fuel cell stack 10 immediately after purging hydrogen (Step S200).

The amount of residual water in the fuel cell stack 10 immediately after the purging of hydrogen may vary according to the temperature of the fuel cell stack 10, the flow rate of hydrogen during purging, or the like.

Information about the amount of residual water in the fuel cell stack 10 immediately after the purging of hydrogen may be obtained through an experiment using neutron radiography (NR). That is, the controller 20 may take images of the fuel cell stack 10 by using neutron radiography while varying purge conditions (e.g., the temperature of the fuel cell stack 10, the inflow rate of hydrogen during purging, purge time, a period of time during which the drain-purge valve 40 is open, the output power of the fuel cell stack 10, and the like) and may tabulate result values obtained by taking the images. The controller 20 may store the obtained table in the memory 30.

The controller 20 may obtain at least some of the purge conditions from components of the fuel cell system and may obtain the amount of residual water in the fuel cell stack 10 immediately after purging hydrogen, based on the obtained purge conditions and the table stored in the memory 30.

Referring to FIGS. 2 and 3, the controller 20 may calculate average temperature and average output power of the fuel cell stack 10 for a predetermined period of time (Step S300).

Figure 4:
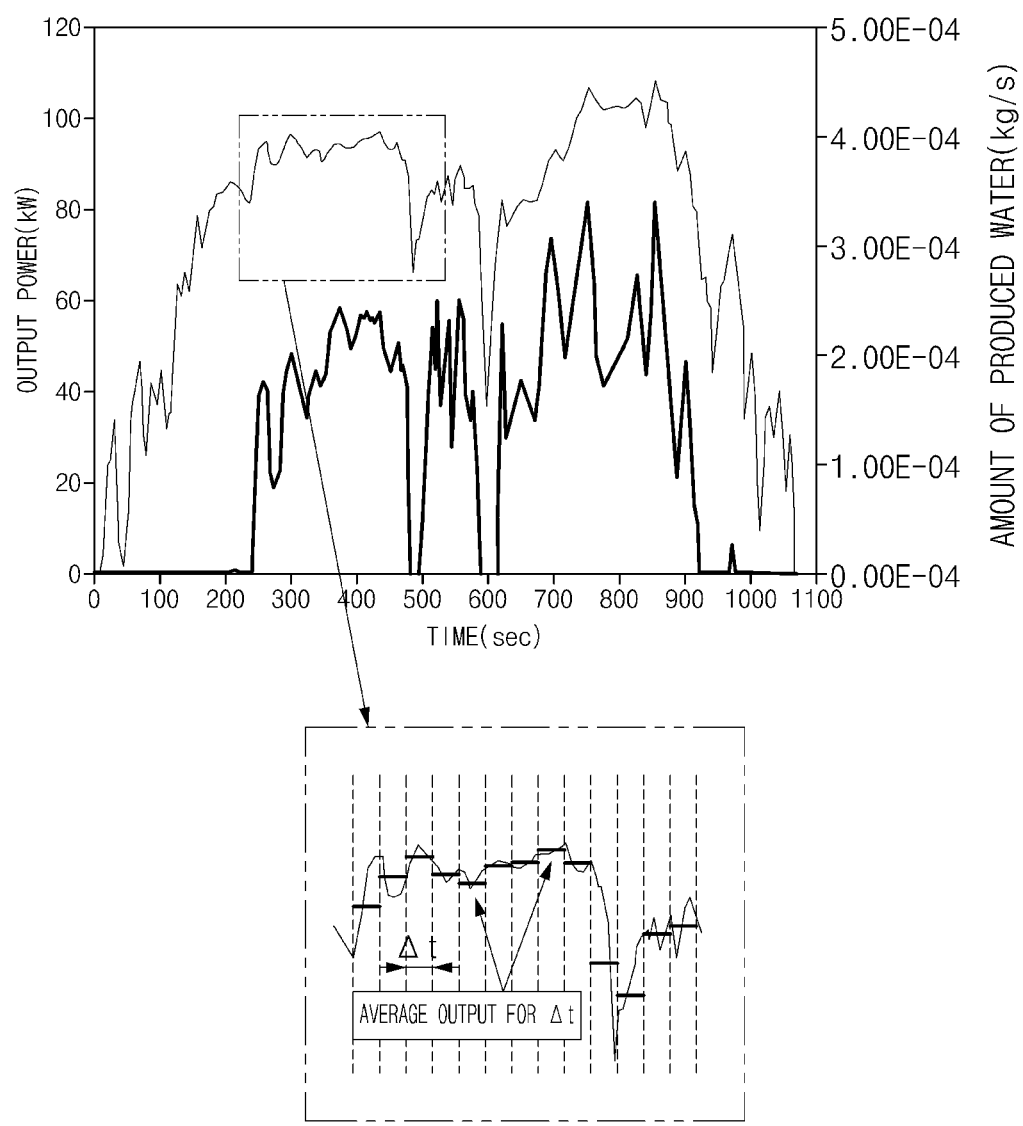
FIGS. 4 to 9 are graphs for explaining the fuel cell system.

Referring to FIG. 4, output power (kW) of the fuel cell stack 10 may vary in a range of 0 to a preset maximum value during one cycle in which the fuel cell stack 10 starts up and stops. That is, output current A of the fuel cell stack 10 may vary in a range of 0 to a preset maximum value during one cycle in which the fuel cell stack 10 operates.

The amount of water produced in the fuel cell stack 10 may also vary as the output power (or the output current) varies. That is because electric power is produced by an electro-chemical reaction of hydrogen and oxygen in the fuel cell stack 10 and a larger amount of water is produced as more electro-chemical reactions are driven.

Furthermore, the amount of water drained from the fuel cell stack 10 by a gas flow in the fuel cell stack 10 may also vary as the output power (or the output current) varies. For example, to raise the output power of the fuel cell stack 10, the flow rate of hydrogen injected into the fuel cell stack 10 per unit time has to be increased, which results in an increase in the amount of water discharged by pressure of hydrogen flowing in the fuel cell stack 10.

In addition, the amount of water produced in the fuel cell stack 10 and the amount of water discharged from the fuel cell stack 10 may vary according to operating conditions even though the fuel cell stack 10 operates with the same output power (or output current).

For example, the amount of water produced in the fuel cell stack 10 that operates with the same output power (or output current) and the amount of water discharged from the fuel cell stack 10 may vary according to the temperature of the fuel cell stack 10, ambient pressure, the shape of a flow passage in the fuel cell stack 10, and resultant flow resistance and rate.

Accordingly, in the present disclosure, to obtain the amount of water remaining in the fuel cell stack 10 according to the output power of the fuel cell stack 10, data on the amount of residual water in the fuel cell stack 10 according to the output power and the operating conditions may be obtained through an experiment on the fuel cell stack 10. The controller 20 may calculate the amount of residual water in the fuel cell stack 10, based on the stored data and conditions such as output power, temperature, and the like of the fuel cell stack 10 that are calculated in real time.

A method of calculating water increments/decrements at preset time intervals $\Delta t$ and adding up the water increments/decrements may be used to obtain the total amount of residual water in the fuel cell stack 10. The method may be understood as having a mathematical similarity to the principle of integral calculus.

The controller 20 may calculate the average temperature $T_{avg}$ and the average output power $P_{avg}$ of the fuel cell stack 10 over the time interval from $t_i$ to $t_{i+1}$ (Step S300).

The controller 20 may calculate the maximum amount of residual water $C_i$ in the fuel cell stack 10 over the time interval from $t_i$ to $t_{i+1}$, based on the calculated average temperature and output power (Step S400).

The maximum amount of residual water $C_i$ may be defined as a value to which the amount of water in the fuel cell stack 10 converges as time passes when the fuel cell stack 10 operates with predetermined output power at a predetermined temperature.

The reason why the amount of water in the fuel cell stack 10 converges to a predetermined value is because a portion of water produced while the fuel cell stack 10 is operating is discharged from the fuel cell stack 10 through an outlet end. While the fuel cell stack 10 is operating, fuel including hydrogen and air may be injected into the fuel cell stack 10 at a predetermined pressure, and a portion of water in the fuel cell stack 10 may be discharged to the outside by the pressure of the fuel and/or air. Accordingly, in the case where the fuel cell stack 10 operates with predetermined output power, the amount of water produced in the fuel cell stack 10 may be balanced with the amount of water discharged from the fuel cell stack 10, and the amount of water in the fuel cell stack 10 at this time may be defined as the maximum amount of residual water $C_i$.

Figure 5:
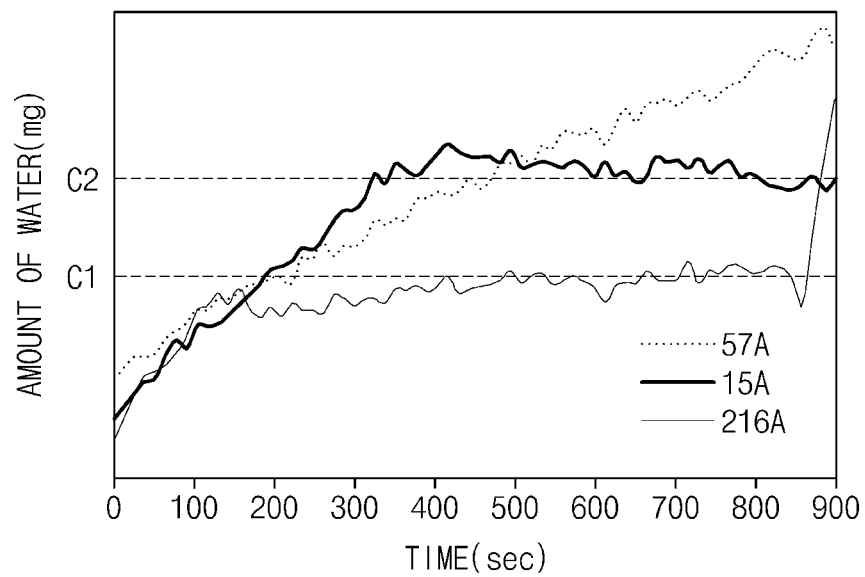

FIG. 5 is a graph depicting the amount of water in the fuel cell stack 10 according to time.

Referring to FIG. 5, the maximum amount of residual water $C_i$ may vary according to the output power of the fuel cell stack 10.

For example, in the case where the output current of the fuel cell stack 10 is 57 A, the amount of water in the fuel cell stack 10 may continue to increase without the maximum amount of residual water $C_i$. That is because the pressure of hydrogen or air introduced into the fuel cell stack 10 is insufficient to effectively discharge water in the fuel cell stack 10.

For example, the maximum amount of residual water $C_i$ may be $C_2$ in the case where the output current of the fuel cell stack 10 is 115 A.

For example, the maximum amount of residual water $C_i$ may be $C_i$ less than $C_2$ in the case where the output current of the fuel cell stack 10 is 216 A. As described above, the maximum amount of residual water $C_i$ may decrease as the output power or current of the fuel cell stack 10 increases.

Meanwhile, the output current values in the graph of FIG. 5 are illustrative and may vary according to the shape, structure, operating condition, or the like of the fuel cell stack 10. For example, according to the type of fuel cell stack or operating conditions of the fuel cell system, the maximum amount of residual water $C_i$ may be present even in the case where the output current of the fuel cell stack 10 is 57 A, or may not be present even in the case where the output current of the fuel cell stack 10 is 115 A.

The above-described data may be obtained through an experiment using neutron radiography (NR). That is, the maximum amount of residual water $C_i$ may be obtained by taking images of the fuel cell stack 10 by using neutron radiography while varying the output power (or temperature) of the fuel cell stack 10 since the maximum amount of residual water $C_i$ varies according to the shape, structure, operating condition, or the like of the fuel cell stack 10.

Information about the maximum amount of residual water $C_i$ according to the type and operating environment of the fuel cell stack 10 may be obtained through the experiment using neutron radiography, and the amount of water in the fuel cell stack 10 in operation may be accurately obtained based on the information.

Figure 6:
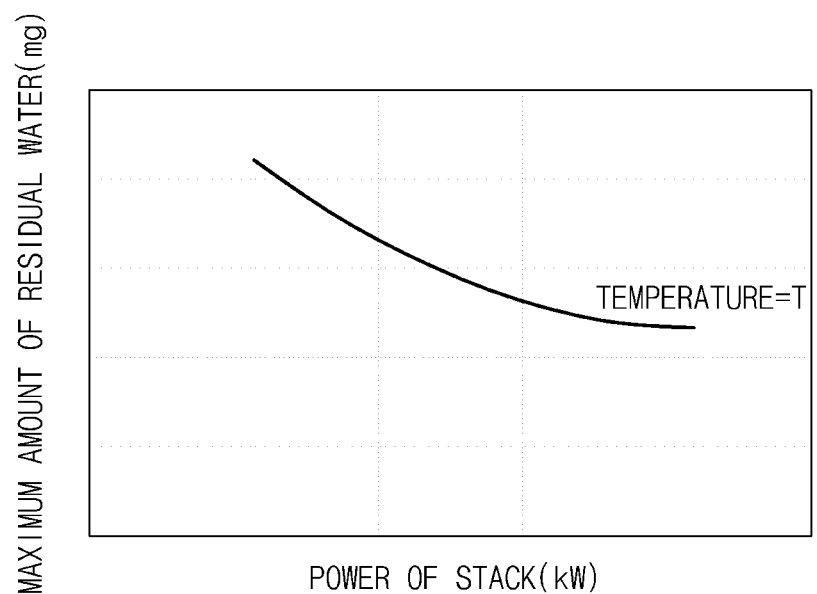

FIG. 6 is a graph depicting a change in the maximum amount of residual water $C_i$ according to the output power of the fuel cell stack 10.

Referring to FIG. 6, the maximum amount of residual water $C_i$ may decrease as the output power of the fuel cell stack 10 increases. However, the maximum amount of residual water $C_i$ may converge when the output power exceeds a predetermined value. With an increase in the output power of the fuel cell stack 10, the amount of water produced in the fuel cell stack 10 may increase, and the pressure (or flow rate) of gas (hydrogen, air, and the like) introduced into the fuel cell stack 10 may also increase. That is because in a section, water is effectively discharged with an increase in the output power, whereas beyond predetermined output power, the effect is reduced by a structural limit such as the shape of a flow passage in the fuel cell stack 10.

Figure 7:
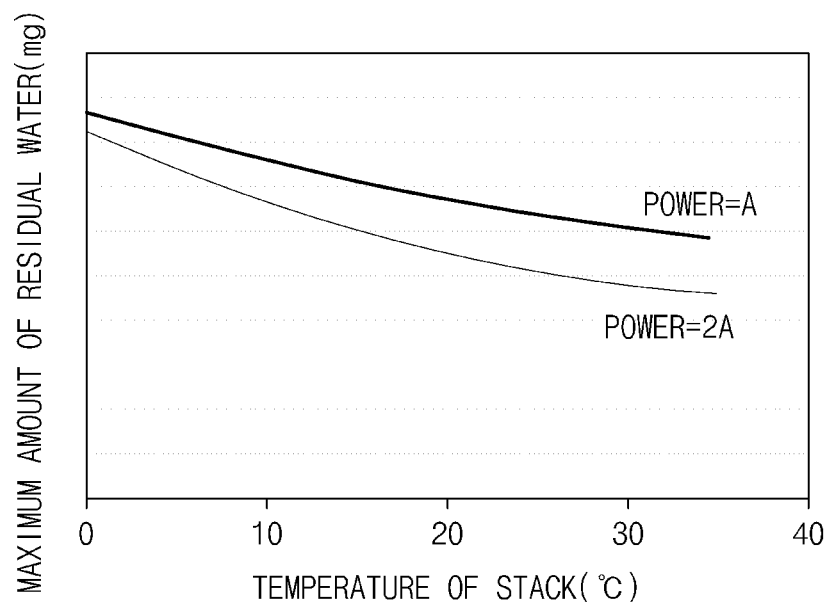

FIG. 7 is a graph depicting a change in the maximum amount of residual water $C_i$ according to the temperature of the fuel cell stack 10.

Referring to FIG. 7, the maximum amount of residual water $C_i$ may decrease as the temperature of the fuel cell stack 10 increases. However, the amount by which the maximum amount of residual water $C_i$ decreases at high temperatures may be less than that at low temperatures. That is because water changes into gas and is discharged along with residual hydrogen and gas in the fuel cell stack 10 is also actively discharged, with an increase in the temperature of the fuel cell stack 10.

The experimental data illustrated in FIGS. 6 and 7, which represent the relationships between the output power and temperature of the fuel cell stack 10 and the maximum amount of residual water, may be stored in the memory 30 as a table. The controller 20 may obtain the temperature and output power of the fuel cell stack 10 and may obtain the maximum amount of residual water $C_i$ that corresponds to the stored temperature and output power of the fuel cell stack 10.

Alternatively, an equation for the maximum amount of residual water $C_i$ according to the temperature and output power of the fuel cell stack 10 may be stored in the memory 30. The controller 20 may store, in the memory 30, an equation obtained based on experimental data on the relationships between the temperature of the fuel cell stack 10 and the maximum amount of residual water and may calculate the maximum amount of residual water $C_i$ by substituting sensed temperature and output power into the equation relating to the maximum amount of residual water $C_i$, which is stored in the memory 30. In this case, there is an advantage that the maximum amount of residual water $C_i$ is also calculated in a range that is not obtained through an experiment.

The controller 20 may obtain a water increment/decrement in the fuel cell stack 10, based on the maximum amount of residual water $C_i$ (Step S500).

The water increment/decrement in the fuel cell stack 10 may be the amount by which the amount of water in the fuel cell stack 10 increases or decreases, and may differ from the amount of water produced in the fuel cell stack 10. That is, the water increment/decrement may be calculated by equation: "(amount of water produced in stack)−(amount of water discharged from stack)".

The controller 20 may determine whether the amount of water $Y(t_i)$ in the fuel cell stack 10 at time $t_i$ is less than the maximum amount of residual water $C_i$ (Step S510).

When it is determined that the amount of water $Y(t_i)$ is less than the maximum amount of residual water $C_i$, the controller 20 may calculate the water increment/decrement $\Delta y_{i+1}$ over the time interval from $t_i$ to $t_{i+1}$ through the following equation (Step S511). In the following equation, characters highlighted in bold type are variables rather than constants.

$$\Delta y_{i+1} = a_{i+1} \cdot \Delta t, a_{i+1} = f(T_{avg}, P_{avg}) > 0 \quad \text{[Equation 1]}$$

The water increment/decrement $\Delta y_{i+1}$ may be calculated by the product of the rate of increase of water $a_{i+1}$ and preset unit time. The rate of increase of water $a_{i+1}$ may be represented by an equation for the average temperature and the average output power of the fuel cell stack 10 over the time interval from $t_i$ to $t_{i+1}$.

When it is determined that the amount of water $Y(t_i)$ is less than the maximum amount of residual water $C_i$, the controller 20 may calculate that the amount of water for the preset unit time $\Delta t$ increases at a constant slope $a_{i+1}$. That is, the controller 20 may calculate that the rate of increase of water $a_{i+1}$ is constant for the preset unit time $\Delta t$.

The rate of increase of water $a_{i+1}$ may vary according to the temperature and output power of the fuel cell stack 10. The rate of increase of water $a_{i+1}$ may be represented by a linear equation for the output power of the fuel cell stack 10. That is, the water increment/decrement $\Delta y_{i+1}$ may be represented as follows:

$$\Delta y_{i+1} = a_{i+1} \cdot \Delta t = (a' \cdot P_{avg} + C_i) \cdot \Delta t, a' = a'' \cdot T_{avg} + C_2 > 0 \quad \text{[Equation 2]}$$

Since the rate of increase of water $a_{i+1}$ is represented by the linear equation for the output power $P_{avg}$ of the fuel cell stack 10, the water increment/decrement $\Delta y_{i+1}$ may be consequently calculated by the linear equation for the output power $P_{avg}$.

Meanwhile, the value a' multiplied by the output power, which is a variable, may be obtained according to the temperature $T_{avg}$ of the fuel cell stack 10. That is, the value a' may be calculated by an equation for the temperature $T_{avg}$. The value a' may be represented by a linear equation for the temperature $T_{avg}$ as in Equation 2.

Figure 8:
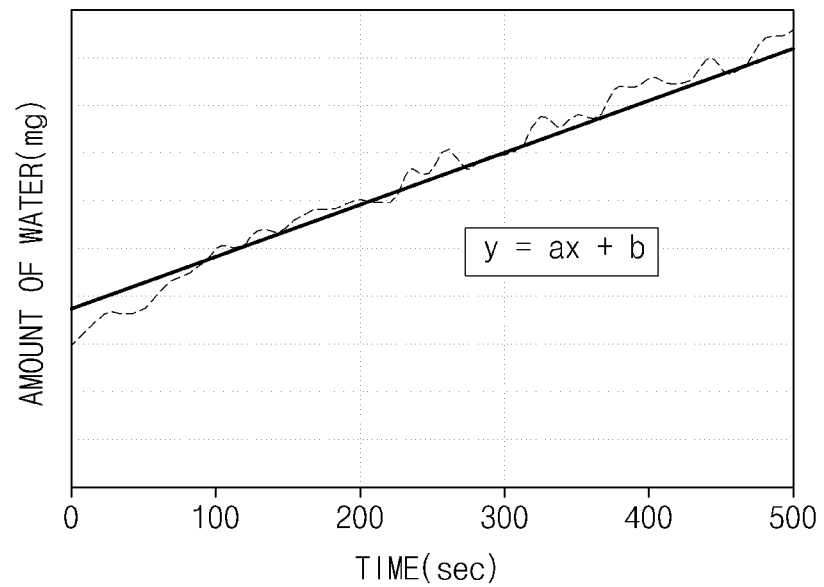

FIG. 8 is a graph depicting a change in the amount of water in the fuel cell stack according to time when the amount of water $Y(t_i)$ in the fuel cell stack is less than the maximum amount of residual water $C_i$.

Referring to FIG. 8, when the amount of water $Y(t_i)$ in the fuel cell stack 10 is less than the maximum amount of residual water $C_i$, experimental values of the amount of water $Y(t_i)$ in the fuel cell stack 10 according to time may be shown by a dotted line.

Based on the experimental values, the amount of water in the fuel cell stack 10 may be approximated to increase at a constant slope (a) according to time, as shown by a solid line. In this case, the slope (a) may vary according to the temperature and output power of the fuel cell stack 10. The slope (a) may be represented by a linear equation for the temperature of the fuel cell stack 10 and a linear equation for the output power of the fuel cell stack 10.

That is, the water increment/decrement $\Delta y_{i+1}$ may increase in proportion to the output power of the fuel cell stack 10 when the amount of water $Y(t_i)$ in the fuel cell stack 10 is less than the maximum amount of residual water $C_i$. Furthermore, the water increment/decrement $\Delta y_{i+1}$ may increase in proportion to the temperature of the fuel cell stack 10 when the amount of water $Y(t_i)$ in the fuel cell stack 10 is less than the maximum amount of residual water $C_i$.

Meanwhile, data on the amount of water in the fuel cell stack 10 according to time under operating conditions (the output power, temperature, and the like of the fuel cell stack 10), which is illustrated in FIG. 8, may be obtained through a neutron radiography experiment.

The controller 20 may take images of the fuel cell stack 10 under different operating conditions (the output power, temperature, and the like of the fuel cell stack 10) by using neutron radiography and may obtain an equation for the water increment/decrement $\Delta y_{i+1}$, based on the experimental data.

The obtained equation may be stored in the memory 30, and the controller 20 may obtain the water increment/decrement $\Delta y_{i+1}$ over the time interval from $t_i$ to $t_{i+1}$ by substituting the average output power and the average temperature of the fuel cell stack 10 for each time interval into the equation for the water increment/decrement $\Delta y_{i+1}$, which is stored in the memory 30.

When it is determined that the amount of water $Y(t_i)$ is not less than the maximum amount of residual water $C_i$, the controller 20 may determine whether the amount of water $Y(t_i)$ exceeds the maximum amount of residual water $C_i$.

When it is determined that the amount of water $Y(t_i)$ exceeds the maximum amount of residual water $C_i$, the controller 20 may calculate the water increment/decrement $\Delta y_{i+1}$ over the time interval from $t_i$ to $t_{i+1}$ through the following equation.

$$\Delta y_{i+1} = b_{i+1} \cdot \Delta t, b_{i+1} = f(T_{avg}, P_{avg}) < 0 \quad \text{[Equation 3]}$$

The water increment/decrement $\Delta y_{i+1}$ may be calculated by the product of the water decrease rate $b_{i+1}$ and preset unit time. The water decrease rate $b_{i+1}$ may be represented by an equation for the average temperature and the average output power of the fuel cell stack 10 over the time interval from $t_i$ to $t_{i+1}$.

When it is determined that the amount of water $Y(t_i)$ exceeds the maximum amount of residual water $C_i$, the controller 20 may calculate that the amount of water for the preset unit time $\Delta t$ decreases at a constant slope bill.

The water decrease rate $b_{i+1}$ may vary according to the temperature and output power of the fuel cell stack 10. The water decrease rate $b_{i+1}$ may be represented by a linear equation for the output power of the fuel cell stack 10. That is, the water increment/decrement $\Delta y_{i+1}$ may be represented as follows:

$$\Delta y_{i+1} = b_{i+1} \cdot \Delta t = (b' \cdot P_{avg} + C_3) \cdot \Delta t, b' = b'' \cdot T_{avg} + C_4 > 0 \quad \text{[Equation 4]}$$

Since the water decrease rate $b_{i+1}$ is represented by the linear equation for the output power $P_{avg}$ of the fuel cell stack 10, the water increment/decrement $\Delta y_{i+1}$ may be consequently calculated by the linear equation for the output power $P_{avg}$.

Meanwhile, the value b' multiplied by the output power, which is a variable, may be obtained according to the temperature $T_{avg}$ of the fuel cell stack 10. That is, the value b' may be calculated by an equation for the temperature $T_{avg}$. The value b' may be represented by a linear equation for the temperature $T_{avg}$ as in Equation 4.

Figure 9:
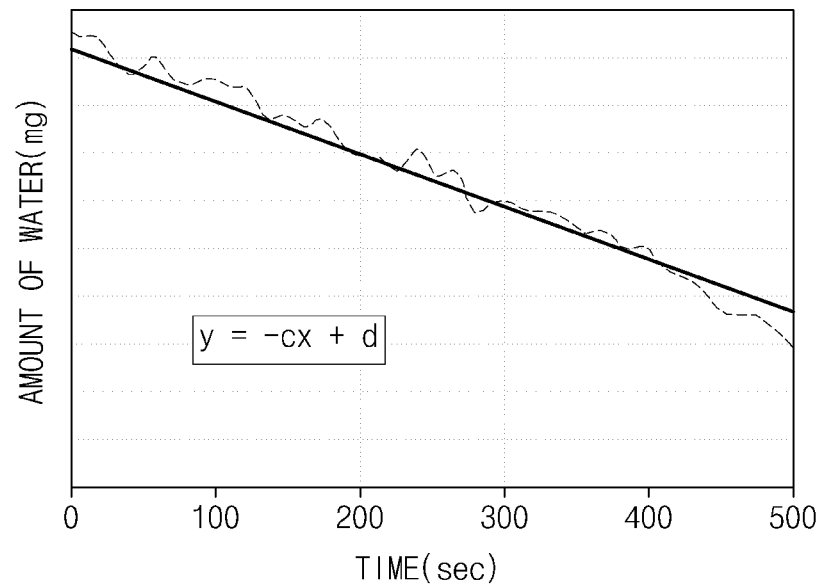

FIG. 9 is a graph depicting a change in the amount of water din the fuel cell stack according to time when the amount of water $Y(t_i)$ in the fuel cell stack exceeds the maximum amount of residual water $C_i$.

Referring to FIG. 9, when the amount of water $Y(t_i)$ in the fuel cell stack 10 exceeds the maximum amount of residual water $C_i$, experimental values of the amount of water $Y(t_i)$ in the fuel cell stack 10 according to time may be shown by a dotted line.

Based on the experimental values, the amount of water in the fuel cell stack 10 may be approximated to decrease at a constant slope (−c) according to time, as shown by a solid line. In this case, the slope (−c) may vary according to the temperature and output power of the fuel cell stack 10. The slope (−c) may be represented by a linear equation for the temperature of the fuel cell stack 10 and a linear equation for the output power of the fuel cell stack 10.

That is, the water increment/decrement $\Delta y_{i+1}$ may decrease in proportion to the output power of the fuel cell stack 10 when the amount of water $Y(t_i)$ in the fuel cell stack 10 exceeds the maximum amount of residual water $C_i$. Furthermore, the water increment/decrement $\Delta y_{i+1}$ may decrease in proportion to the temperature of the fuel cell stack 10 when the amount of water $Y(t_i)$ in the fuel cell stack 10 exceeds the maximum amount of residual water $C_i$.

The controller 20 may determine that the water increment/decrement $\Delta y_{i+1}$ is 0 in the case where it is determined that the amount of water $Y(t_i)$ is not less than the maximum amount of residual water $C_i$ and does not exceed the maximum amount of residual water $C_i$ (Step S523).

That is, when it is determined that the amount of water $Y(t_i)$ is equal to the maximum amount of residual water $C_i$, the controller 20 may calculate that the amount of water in the fuel cell stack 10 is constant over the time interval from $t_i$ to $t_{i+1}$.

Meanwhile, although not illustrated, according to another form of the present disclosure, the controller 20 may obtain the water increment/decrement $\Delta y_{i+1}$ per preset unit time, based on the table of water increments/decrements according to output power and temperature, which is stored in the memory 30.

Data on water increments/decrements according to a change in the output power and temperature of the fuel cell stack 10, which is obtained through a neutron radiography experiment, may be stored in the memory 30 as a table. The neutron radiography experiment may be conducted by varying the output power and temperature of the fuel cell stack 10 under the condition in which the amount of water in the fuel cell stack 10 is less than the maximum amount of residual water $C_i$. Furthermore, the neutron radiography experiment may be conducted by varying the output power and temperature of the fuel cell stack 10 under the condition in which the amount of water in the fuel cell stack 10 exceeds the maximum amount of residual water $C_i$. The data on water increments/decrements according to the operating conditions of the fuel cell stack 10 (whether the amount of water in the fuel cell stack 10 exceeds or is less than the maximum amount of residual water, the output power, and the temperature), which is obtained through the experiment, may be stored in the memory 30 as a table.

The controller 20 may obtain the average output power and the average temperature of the fuel cell stack 10 over the time interval from $t_i$ to $t_i+1$ and may obtain the water increment/decrement $\Delta y_{i+1}$ corresponding to the average output power and the average temperature from the table stored in the memory 30, based on whether the amount of water $Y(t_i)$ exceeds or is less than the maximum amount of residual water $C_i$.

As described above, the controller 20 may calculate the water increment/decrement $\Delta y_{i+1}$, based on the equations stored in the memory 30, or may load the water increment/decrement $\Delta y_{i+1}$, based on the table stored in the memory 30, to consequently obtain the water increment/decrement $\Delta y_{i+1}$ over the time interval from $t_i$ to $t_{i+1}$.

As in the following equation, the controller 20 may obtain the amount of water $Y(t_{i+1})$ at time $t_{i+1}$ by adding the water increment/decrement $\Delta y_{i+1}$ over the time interval from $t_i$ to $t_{i+1}$ to the amount of water $Y(t_i)$ at time $t_i$ (Step S600).

$$Y(t_{i+1}) = Y(t_i) + \Delta y_{i+1} \qquad \text{[Equation 5]}$$

The controller 20 may obtain the amount of water $Y(t_n)$ in the fuel cell stack 10 at time to by adding the water increment/decrement $\Delta y_{i+1}$ for each preset time interval $\Delta t$ to the amount of residual water in the fuel cell stack 10 immediately after purging hydrogen in the above-described way.

The controller 20 may control the drain-purge valve 40 to purge hydrogen in the fuel cell stack 10, based on the amount of water in the fuel cell stack 10 (Step S700).

The above-configured fuel cell system may obtain a water increment/decrement for each preset time interval and may obtain the amount of water in the fuel cell stack 10 for each preset time interval correspondingly.

That is, the fuel cell system of the present disclosure may obtain the amount of water actually remaining in the fuel cell stack 10 that corresponds to the difference between the amount of water produced in the fuel cell stack 10 and the amount of water discharged through an outlet by a gas flow in the fuel cell stack 10. Accordingly, the fuel cell system of the present disclosure may accurately obtain the amount of water actually remaining in the fuel cell stack 10 in real time, compared with a conventional technology for calculating only the amount of water produced in the fuel cell stack 10.

Based on the amount of water in the fuel cell stack 10 that is detected in real time, the fuel cell system may determine whether the water in the fuel cell stack 10 needs to be discharged and may discharge the water at the right time, thereby preventing degradation in power generation performance of the fuel cell stack 10 and enhancing durability of the fuel cell system.

Although exemplary forms of the present disclosure have been described above with reference to the accompanying drawings, it should be understood that the present disclosure is not limited thereto and various modifications and changes can be made by those skilled in the art to which the present disclosure pertains without departing from the spirit and scope of the present disclosure.

What is claimed is:

1. A fuel cell system comprising:
   a fuel cell stack configured to produce electric power and water through an electro-chemical reaction of hydrogen and air; and
   a controller configured to:
   calculate an amount of water in the fuel cell stack based on an output power of the fuel cell stack and a maximum amount of residual water to which the amount of water in the fuel cell stack converges over time, and
   calculate the amount of water in the fuel cell stack further based on an amount of residual water in the fuel cell stack immediately after the water is discharged from the fuel cell stack.

2. The fuel cell system of claim 1, wherein the controller is configured to calculate the maximum amount of residual water based on a temperature of the fuel cell stack and the output power of the fuel cell stack.

3. The fuel cell system of claim 1, wherein the controller is configured to calculate the amount of water in the fuel cell stack based on a rate of increase of water in the fuel cell stack based on a temperature of the fuel cell stack and the output power of the fuel cell stack.

4. The fuel cell system of claim 3, further comprising:
   a memory configured to store information about a relationship between the temperature of the fuel cell stack and the rate of increase of water and a relationship between the output power of the fuel cell stack and the rate of increase of water,
   wherein the controller is configured to calculate the rate of increase of water based on the information stored in the memory, the temperature of the fuel cell stack, and the output power of the fuel cell stack.

5. The fuel cell system of claim 1, wherein the controller is configured to calculate that the amount of water in the fuel cell stack increases at a constant slope for a preset unit of time when the amount of water in the fuel cell stack is less than the maximum amount of residual water.

6. The fuel cell system of claim 1, wherein the controller is configured to calculate that the amount of water in the fuel cell stack decreases at a constant slope for a preset unit of time when the amount of water in the fuel cell stack exceeds the maximum amount of residual water.

7. The fuel cell system of claim 1, wherein the controller is configured to calculate that the amount of water in the fuel cell stack is constant for a preset unit of time when the amount of water in the fuel cell stack is equal to the maximum amount of residual water.

8. The fuel cell system of claim 1, wherein the controller is configured to calculate the amount of water in the fuel cell stack by using a linear equation for the output power of the fuel cell stack when the amount of water in the fuel cell stack is less than the maximum amount of residual water.

9. The fuel cell system of claim 8, wherein in the linear equation for the output power, a value multiplied by the output power, which is a variable, is obtained based on temperature of the fuel cell stack.

10. The fuel cell system of claim 1, wherein the controller is configured to calculate the amount of water in the fuel cell stack further based on elapsed time counted from when water is discharged from the fuel cell stack.

11. The fuel cell system of claim 1, wherein the controller is configured to:
    control the fuel cell stack to execute hydrogen purging to discharge water from the fuel cell stack; and
    calculate the amount of residual water in the fuel cell stack, based on temperature of the fuel cell stack and an amount of flow of the hydrogen during the hydrogen purging.

12. The fuel cell system of claim 1, wherein the controller is configured to:
    calculate an amount of water increment/decrement in the fuel cell stack for each preset time interval from when the water is discharged from the fuel cell stack; and
    calculate the amount of water in the fuel cell stack by integrating the amount of residual water in the fuel cell stack and the amount of water increment/decrement for each time interval.

13. The fuel cell system of claim 1, further comprising:
    a memory configured to store information about a rate of increase of water in the fuel cell stack that is based on data obtained by taking an image of the fuel cell stack by using neutron radiography and information about an amount of residual water immediately after water is discharged from the fuel cell stack.

14. The fuel cell system of claim 1, further comprising:
a valve configured to open/close a water discharge passage in the fuel cell stack,
wherein the controller is configured to control the valve to discharge water from the fuel cell stack when the amount of water in the fuel cell stack is greater than or equal to a preset threshold value.

15. The fuel cell system of claim 1, wherein the amount of water in the fuel cell stack is based on a difference between an amount of water produced in the fuel cell stack and an amount of water discharged from the fuel cell stack by a gas flow in the fuel cell stack.

* * * * *